M. DENNIS.
Horse Hay-Fork.
No. 85,167.  Patented Dec. 22, 1868.
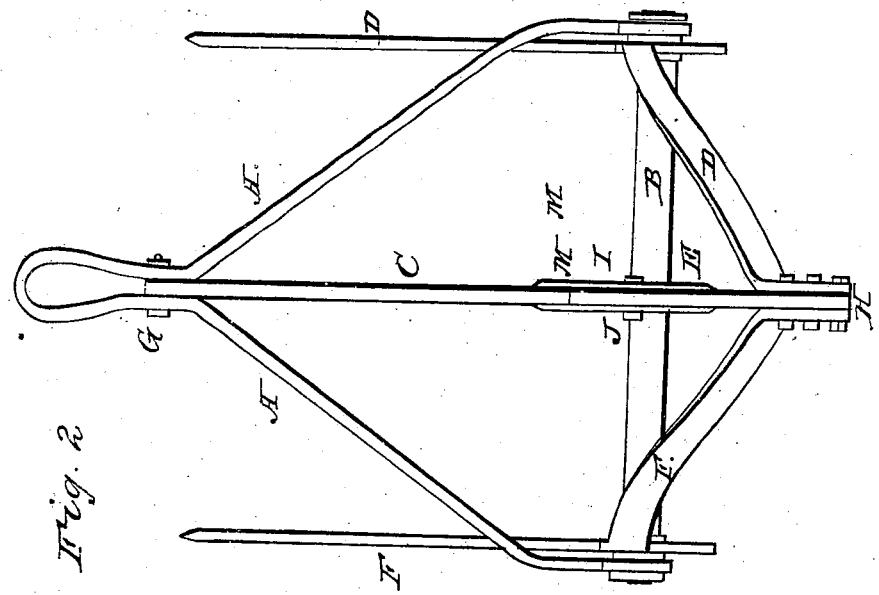
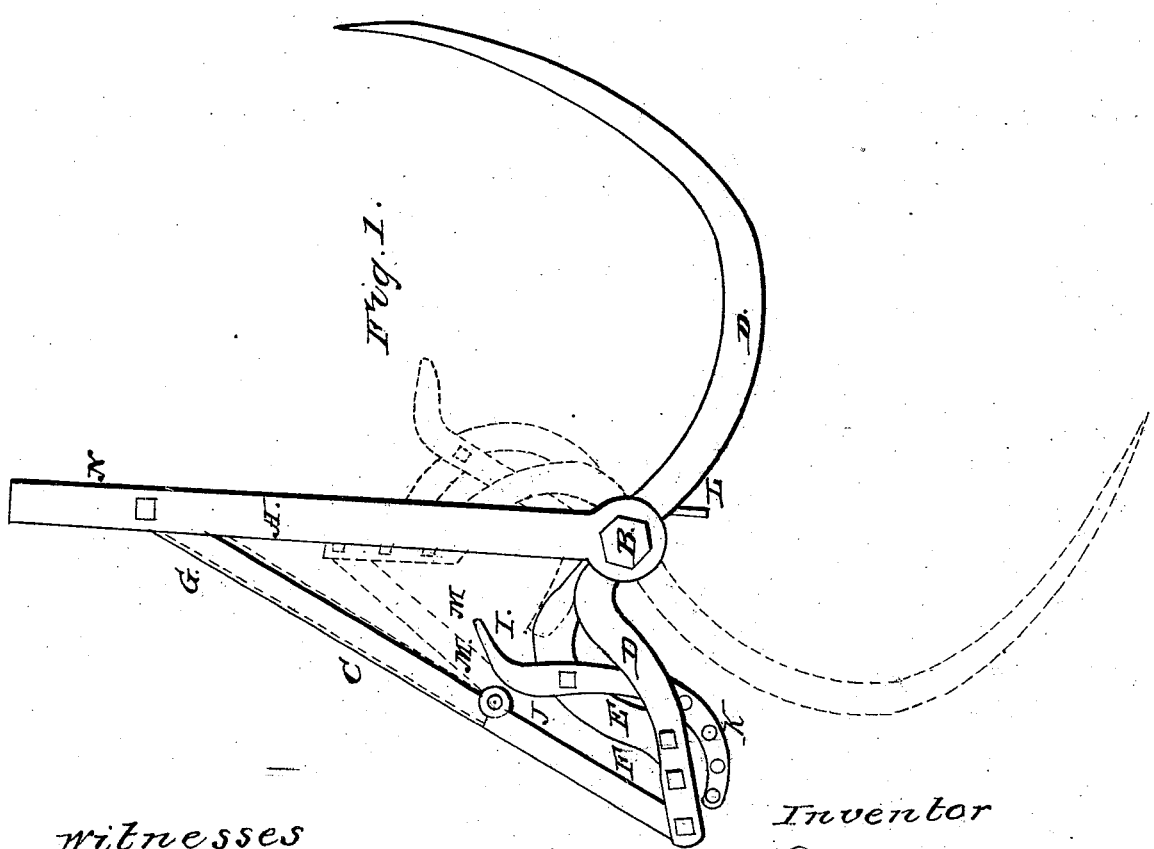
Witnesses
Samuel J. Parker
A. Burritt
Inventor
Moses Dennis

MOSES DENNIS, OF BARTON, NEW YORK.

Letters Patent No. 85,167, dated December 22, 1868.

IMPROVEMENT IN HORSE HAY-FORKS.

The Schedule referred to in these Letters Patent and making part of the same.

*To all whom it may concern:*

Be it known that I, MOSES DENNIS, of Barton, Tioga county, New York, have invented an Improved Horse-Fork; and I do hereby declare that the following is a full and exact description thereof, reference being had to the accompanying drawings, and to the letters thereon.

Figure 1 is a side view of my fork, showing the elongated tines, trip-lever, bail, and brace, when in position, loaded, and by the dotted lines, the position of tines, brace, trip lever, and bail, when unloaded or just tripped.

Figure 2 is a view of the fork from its back or rear.

My object is to make a fork with no obstruction in its use by a handle, simple and compact, with the load bearing mainly in the cavity of the teeth, near their heels or attachment of the bail, durable, and efficient in its action.

For these purposes I use two or more curved teeth, whose points are curved, so as to be a little hook-shaped, and extend the teeth to the rear of the fork, so as to support and control the tripping-apparatus, using preferably three teeth, the middle one of which is, in a perpendicular plane, straight, but curved on its horizontal lines, and bent upwards, just in rear of the bail, to receive the trip-lever, while the other two teeth are bent laterally, to meet and support the middle tooth, thus making a very firm and simple frame-work, freely turning on a connecting-bar.

At the posterior end of the frame thus made a jointed brace is hinged, and runs to a bolt near the top of the bail.

I make my trip-lever somewhat S-shaped, with a broad sliding surface on the upper end, which, by a slight tension on a cord, bends the joint of the brace and trips the fork.

I have planned with especial reference to compactness, neatness, and efficient use, in all parts of my fork. This is seen in the curve of the teeth, their relation to the trip-lever and brace, bail, and, as a whole, in every part; also, that while strictly my fork has no handle, yet, when tripped, the flexed brace so fixes the bail that the bail becomes a handle.

In fig. 1, A is a bail separated by the rod B, and C is the brace from the top of the bail to the frame, made by the three teeth, D, E, and F, hinged, at G, on the bail, and at H on the teeth; and I is the trip-lever, made somewhat S-shaped, and hinged, at J, on the middle tooth, and with the holes K for the trip-cord, which I preferably use in any position it can assume, yet put through the ring L when desirable. The bail turns on the rod B, except when fixed and loaded or unloaded, when the brace C holds it fast. In the latter case, while being thrust into the hay or grain or other article, it virtually becomes a handle.

In fig. 2, the same letters show the same parts.

The peculiar fitness and uses of my invention require a little attention to be fully manifest, yet are apparent to those skilled in the art to which it appertains.

Claims.

1. The arrangement of the jointed brace C, so that when flexed it holds the bail fast, and enables the bail to be used as a handle for entering the fork in loading, as set forth.

2. The arrangement of the ring L on the middle tooth before the rod B, and held by the tooth, in combination with the S-shaped trip-lever I, as described.

3. The combination of the bail A, tines D E F, connecting toggle-bar C, lever I, and trip-rope, when constructed and arranged as described.

MOSES DENNIS.

Witnesses:
   SAMUEL J. PARKER,
   ABEL BURRITT.